United States Patent
Nair (10) Patent No.: US 11,051,164 B2
(45) Date of Patent: *Jun. 29, 2021

(54) SYSTEMS, METHODS, AND COMPUTER PROGRAM PRODUCTS FOR PROVIDING USER AUTHENTICATION FOR A VOICE-BASED COMMUNICATION SESSION

(71) Applicant: PAYPAL, INC., San Jose, CA (US)

(72) Inventor: Rahul Nair, Leander, TX (US)

(73) Assignee: PayPal, Inc., San Jose, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 16/178,203

(22) Filed: Nov. 1, 2018

(65) Prior Publication Data

US 2020/0145823 A1 May 7, 2020

(51) Int. Cl.
| | |
|---|---|
| *H04W 12/06* | (2021.01) |
| *H04M 3/493* | (2006.01) |
| *H04W 4/16* | (2009.01) |
| *G06F 21/36* | (2013.01) |
| *G06F 16/9535* | (2019.01) |

(52) U.S. Cl.
CPC ........ *H04W 12/06* (2013.01); *G06F 16/9535* (2019.01); *G06F 21/36* (2013.01); *H04M 3/493* (2013.01); *H04W 4/16* (2013.01)

(58) Field of Classification Search
CPC ..... H04W 12/06; H04W 4/16; G06F 16/9535; G06F 21/36; H04M 3/493; H04M 2203/6072; H04M 2203/6045; H04M 3/5166

USPC .......................................................... 726/6
See application file for complete search history.

(56) References Cited

U.S. PATENT DOCUMENTS

| | | | | |
|---|---|---|---|---|
| 7,039,165 | B1 * | 5/2006 | Saylor | H04M 3/493 379/142.15 |
| 7,606,560 | B2 * | 10/2009 | Labrou | H04W 12/069 455/411 |
| 7,953,400 | B2 * | 5/2011 | Lee | H04M 1/6066 455/418 |
| 8,140,340 | B2 * | 3/2012 | Bhogal | G10L 17/00 704/273 |
| 8,296,562 | B2 * | 10/2012 | Williams | H04L 63/0838 713/155 |
| 9,183,549 | B2 * | 11/2015 | Kapur | G06Q 20/12 |
| 9,318,114 | B2 * | 4/2016 | Zeljkovic | G10L 17/04 |
| 9,426,151 | B2 * | 8/2016 | Richards | H04L 63/10 |
| 9,462,134 | B2 * | 10/2016 | Arslan | G06F 21/42 |
| 10,440,530 | B1 * | 10/2019 | Ananthapur Bache | H04M 3/38 |
| 10,692,083 | B2 * | 6/2020 | Todasco | G06Q 20/16 |
| 2003/0163739 | A1 * | 8/2003 | Armington | G10L 17/00 726/3 |

(Continued)

*Primary Examiner* — Badri Narayanan Champakesan
(74) *Attorney, Agent, or Firm* — Haynes and Boone LLP (57) ABSTRACT

A method includes: in response to a request from a human user to access account information, authenticating the human user via a graphical user interface (GUI); storing a result of authenticating the human user in a storage system; in response to authenticating the human user, directing the human user to a voice-based communication session; accessing the result of authenticating the human user from the storage system by the voice-based communication session; and providing access by the human user to the account information in the voice-based communication session based on the result of authenticating the human user.

20 Claims, 9 Drawing Sheets

(56) References Cited

U.S. PATENT DOCUMENTS

| | | | | |
|---|---|---|---|---|
| 2005/0223408 | A1* | 10/2005 | Langseth | H04M 3/493 |
| | | | | 725/86 |
| 2007/0283416 | A1* | 12/2007 | Renaud | G06Q 20/40 |
| | | | | 726/2 |
| 2008/0252922 | A1* | 10/2008 | Ikegami | H04N 1/00222 |
| | | | | 358/1.15 |
| 2009/0313165 | A1* | 12/2009 | Walter | H04L 63/08 |
| | | | | 705/41 |
| 2011/0002457 | A1* | 1/2011 | Sharma | G06Q 30/02 |
| | | | | 379/266.1 |
| 2016/0007195 | A1* | 1/2016 | Goldstone | H04W 12/068 |
| | | | | 455/411 |
| 2016/0269403 | A1* | 9/2016 | Koutenaei | H04L 63/107 |
| 2018/0139606 | A1* | 5/2018 | Green | H04L 63/107 |

* cited by examiner

Which cross street is closest to your address on 211 Main St. ?

○ 135TH ST
○ CARNATION CT
▲ ○ EGRET ST
○ KING AVE
○ COBBLESTONES AVE
○ LEMONS AVE

SYSTEMS, METHODS, AND COMPUTER PROGRAM PRODUCTS FOR PROVIDING USER AUTHENTICATION FOR A VOICE-BASED COMMUNICATION SESSION

BACKGROUND

Field of the Invention

The present disclosure generally relates to user authentication and, more specifically, to techniques for authenticating users via a graphical user interface for a voice-based communication session.

Related Art

As time goes on, consumers tend to have more and more electronic accounts. Such accounts may include social media accounts, subscriptions to services, service provider accounts, and the like. Occasionally, a consumer may desire to make changes to an account. One example is a consumer having a service provider account, and the user may desire to link a bank account to the service provider account. However, adding a bank account to a service provider account has the potential to cause harm if it is done fraudulently (e.g., by someone who is not the authorized user), such as unauthorized use of funds from the bank account.

Furthermore, some consumer requests are somewhat complicated and may be best handled by a human at a call center in a case when the consumer cannot, or prefers not to, make changes online, such as for fear of having authentication credentials or other sensitive data intercepted or otherwise fraudulently obtained. Therefore, some services have interactive voice recognition (IVR) systems that perform some tasks with the user on behalf of the human at the call center. For instance, a user may use a telephone to call a helpline and speak to a machine, where the machine identifies the user and the particular account, identifies a user intent, and authenticates the user before passing the user to a human call center employee to carry out the request.

Many current uses of IVR for user authentication have been less than satisfactory. For instance, some IVR systems attempt to provide additional security by subjecting the user to further authentication protocols. One example is providing the user with a series of questions, each question having four or five options (e.g., asking a user personal information such as which high school the user attended or which color was the user's first car). The point of the security protocol is to test whether the caller is the person that the caller claims to be. Nevertheless, this can be difficult for an IVR system because pronunciation may be difficult for the machine, and when a user speaks the response, the machine then attempts to translate the speech into words and then map the response back to one of the options. It can also be difficult for users who must choose one of the options when the machine may mispronounce one or more options. As a result, pass results may be as low as 20% or worse. Often times, this may lead to the user being passed to a human call center employee to perform authentication, thereby unnecessarily occupying valuable resources.

IVR are typically used as a less expensive option to human call center employees. It would be desirable to have a technological solution that may perform as much administrative tasks as possible, including authentication, in the larger context of a voice-based communication session.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments provide for systems and methods that perform user authentication by a graphical user interface (GUI) before sending the user to a voice-based communication session.

In one example, a user is logged into her service provider account through a web browser or mobile application. The user desires to make a change to the account (e.g., adding a bank account to the service provider account), so the user goes to an online help center of the service provider and while still logged in. The online help center includes a GUI to determine the user's intent and to present an authentication challenge to the user. For instance, the user may either select an option for adding the bank account or may type in a request to add a bank account using the GUI. Once the online help center recognizes the user's intent, it matches that intent to an authentication policy and presents an authentication challenge according to the policy.

Continuing with the example, the authentication challenge may include knowledge-based authentication (KBA), which presents the user with questions and options to answer the question based on items that the correct user would be expected to know. The authentication challenge is presented graphically, rather than through a voice-based channel. Thus, the user may select a correct answer by touching or clicking an option that is displayed graphically. The user may then submit the answer and request to call for voice-based assistance. Advantages of using the GUI, as opposed to voice, to authenticate include less susceptibility of sensitive information being heard by others near the user and less friction during the authentication process, such as in noisy environments where it may be difficult for the user to hear or accurately convey a verbal response.

Further in this example, once the human user has been authenticated via the GUI, the computer system associated with the service provider saves the result of authenticating the human user in intermediate storage. The computer system of the service provider may then direct the human user to a voice-based communication session by either providing a phone number for the user to call or providing an option for the user to start a voice call by the GUI, such as by Web Real-Time Communication (WebRTC).

In one example use case, a call center then accesses the result of authenticating the human user from the intermediate storage. For example, since the user was logged into the service provider account, the intermediate storage stores the account number, the user's intent, the method of challenge that was presented, and the outcome of the challenge in a database entry. When the user dials into the call center, the user is placed with interactive voice recognition (IVR), and the IVR machine then attempts to access the result of the authenticating by matching the user's phone number to an account. The IVR machine may also ask for other identifying information, such as last four digits of Social Security number, digits from a bank account or credit card, or the like. Once the system identifies the account number, then it searches the intermediate storage by the account number and retrieves the result.

Further continuing with the example, once the IVR machine has determined that the result of the authentication is positive, the IVR machine may continue to service the user's request according to the intent or may pass the user to a human call center employee to service the intent. In any event, assuming the user passed authentication appropriate with her intent, the user's request may then be serviced.

In another example, the user may be logged into some other online account, such as an account associated with a search engine. The search engine and the service provider may have an established relationship, wherein they agree to share some account information. Accordingly, a user who is logged into the search engine account may then access service provider online help and authentication via a GUI provided by the search engine. For instance, the user may type in "how do I add a bank account to my service provider account," and the search engine sends that request and search engine account information to the service provider, which determines a service provider account by searching a database of service provider accounts linked to search engine accounts. The service provider may then provide an appropriate challenge for the intent to the search engine, which then renders the challenge in the GUI. The user may then accomplish the challenge to authenticate herself, and the result of the authentication is provided back to the service provider, which stores it in intermediate storage. A similar technique may be provided for a user who is logged in to a social media account that may be linked to a service provider account as well.

The scope of embodiments is not limited to voice-based communications. Rather, the techniques described herein may be applied to any interaction facilitated by a system where a human agent is servicing the user's request. For example, various embodiments may include a textual communication feature, which may be a non-voice channel, but may be assisted by human agents. For instance, one embodiment includes a customer completing authentication at an on-line help center and instead of calling into a voice-based service, clicks on a "chat with us" button and gets connected to an agent via live chat. The chat application may then check the intermediate storage for the intent and the results of authentication, as in the examples above.

Various embodiments may provide one or more advantages over other systems. For instance, success rates of web-based challenges are expected to be higher than IVR authentication, possibly significantly higher in some applications. Therefore, an increased pass rate (relative to IVR authentication) may increase convenience for a user as well as decrease a number of times that a user may have to speak to a human employee to be authenticated. Put another way, various embodiments may shift administrative burden, including authentication, mostly to a web-based and IVR system, reserving the efforts of human call center employees for key customer requests. Reserving the efforts of human call center employees may result in lower cost for the service provider and greater convenience for a user.

Figure 1:
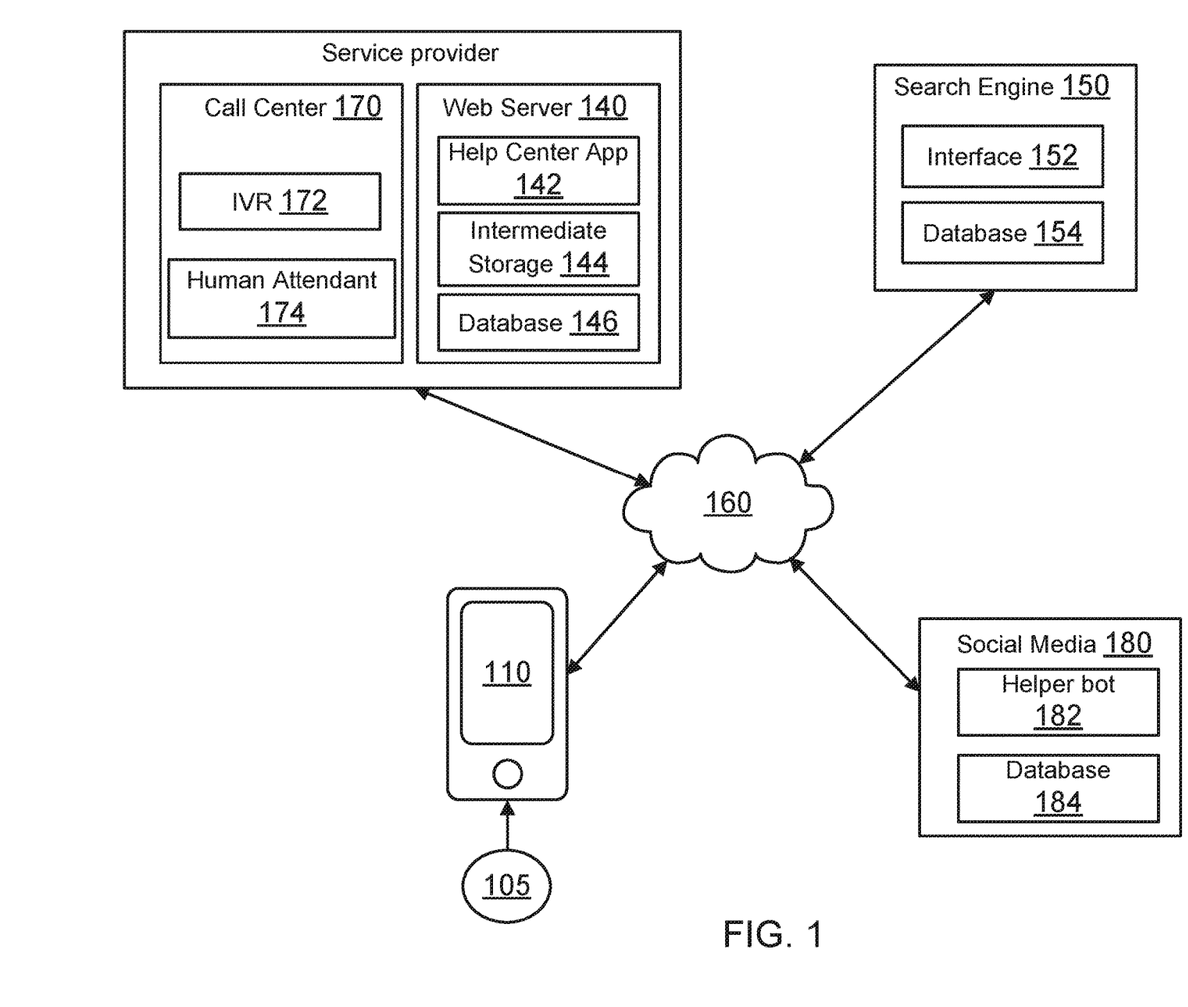
FIG. 1 is block diagram of a networked system suitable for use with authenticating a user according to an embodiment.

FIG. 1 is a block diagram of a networked system suitable for implementing user authentication according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a web server 140, a search engine server 150, a call center 170, and a social media server 180 in communication over a network 160. Network 160 may be implemented as a single network or a combination of multiple networks. For example, in various embodiments, network 160 may include the Internet or one or more intranets, landline networks, wireless networks, and/or other appropriate types of networks.

User device 110, web server 140, search engine server 150, a server at call center 170, and social media server 180 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication over network 160. For example, in one embodiment, the user device 110 may be implemented as a personal computer (PC), a smart watch, a smart phone, a smart phone with additional hardware such as NFC chips, BLE hardware etc., wearable devices with similar hardware configurations such as a gaming device, a virtual reality headset, that talk to a smart phone with unique hardware configurations and running appropriate software, laptop computer, and/or other types of computing devices capable of transmitting and/or receiving data, such as an iPad™ from Apple™.

User device 110 may employ a transceiver to communicate with network 160 and web server 140, search engine server 150, call center 170, and social media server 180. User device 110 may communicate with web server 140, search engine server 150, call center 170, and social media server 180 either via network 160 or via other means (e.g., directly by Bluetooth or NFC).

User device 110 may include a web browser or application which may be used, for example, to provide a convenient interface to permit a human user 105 to browse information available over network 160. For example, in one embodiment, user device 110 may include a web browser configured to view information available over the Internet, such as a user account for online shopping and/or merchant sites for viewing and purchasing goods and services. In this example, user device 110 may be used by human user 105 to access help center application 142, search engine interface 152, and/or social media helper bot 182 over network 160 and using either a web browser or other application installed thereon.

User device 110 also may include other applications to perform functions, such as email, texting, voice and IM applications that allow user 105 to send and receive emails, calls, and texts through network 160, as well as applications that enable the user 105 to communicate, transfer information, and make payments.

Any of the servers 140, 150, 180, or a server at call center 170 may be implemented using any appropriate hardware and software. In one example, the servers 140, 150, 170, 180, or a server at call center 170 may include one or more commodity servers running Linux or another operating system. Additionally or alternatively, servers 140, 150, 180, or a server at call center 170 may include software servers running on any appropriate hardware, such as a laptop computer, a desktop computer, a server in a rack, a tablet computer, or the like. The various applications 142, 152, 172, and 182 may be implemented as programs running on operating systems at their various respective servers. It should also be noted that while the various servers 140, 150, 180, or a server call center 170 is illustrated in this example as a single box, servers may be implemented by themselves or as groups of servers or as virtual servers.

Web server 140 may be maintained, for example, by an entity that provides accounts for consumers. For example, web server 140 may be maintained by a service provider (e.g., PayPal Holdings, Inc.), a bank, an entity holding health records, or the like. The various examples that follow are directed toward a scenario where web server 140 is associated with a service provider; however, it is understood that the concepts described herein apply equally well to other entities providing sensitive accounts.

Web server 140 includes a help center application 142, intermediate storage 144, and database 146. In one embodiment, human user 105 may interact with help center application 142 through a browser or other application over network 160 to access sensitive account information using a GUI. For instance, the help center application 142 may include a website that is presented externally over network 160 to a browser or other application at device 110 using HTTP or other appropriate protocols. Human user 105 may access the help center application 142 for help in accessing secure account information (e.g., requesting a refund, adding a bank account to a service provider account, deleting an account from a service provider account, making a payment, and the like).

Intermediate storage 144 may be associated with web server 140 or may be implemented at a different server (not shown). In this example, intermediate storage 144 may include one or a plurality of storage devices used to facilitate the authorization techniques described herein. For instance, the examples described below include storing account number, user intent, method of challenge, outcome of challenge, and other information so that a server at call center 170 may access such information from the intermediate storage 144 to confirm that a user has been authenticated.

In this example, database 146 may be associated with web server 140 or may be implemented at a different server (not shown). In this example, database 146 may include any helpful information regarding users and their accounts. For instance, database 146 may include user identities, account numbers, login credentials, and the like to allow a user to login to her account via the web.

Search engine server 150 may be associated with an entity providing a search engine. An example of a search engine is the Google™ search engine provided by Google LLC. However, the scope of embodiments is not limited to any particular search engine, as any search engine now known or later developed may interface with web server 140 as described further below. Interface application 152 provides a search engine GUI, which may be accessed by human user 105 over network 160 to perform web searching and, as explained further below, requesting access to sensitive information maintained by web server 140.

Social media server 180 may be associated with an entity providing a social media service. An example of a social media service is Facebook Messenger™ provided by Facebook, Inc. However, the scope of embodiments is not limited to any particular social media service, as any social media service now known or later developed may interface with web server 140 as described further below. Helper bot application 182 may include a GUI from which a user may request access to sensitive information maintained by web server 140 and as explained further below. For instance, helper bot application 182 may provide a chat interface, wherein human user 105 may submit a request for help textually via the chat interface.

Call center 170 may include one call center or more than one call center. Call center 170 may also include one or more physical facilities or virtual facilities for human attendance, such as human attendant 174. Call center 170 may also include IVR application 172 which may run upon one or more of the servers associated with call center 170. IVR application 172 may interface with the user 105 in a call-based communication session. For instance, IVR application 172 may include a machine that provides pre-scripted dialogue to human user 105 to solicit input from user 105. User 105 may provide input to IVR application 172 by speaking, by pressing telephone keys to create tones, or the like. In an example in which web server 140 and call center 170 are both associated with a service provider, the various techniques described herein may perform user authentication by help center application 142 and then transfer human user 105 to either IVR application 172 or human attendant 174 as appropriate. In a service provider example, IVR application 172 may solicit input from human user 105 to determine an account number associated with human user 105 or other information. In some instances, human user 105 may be serviced by IVR application 172, though for more complicated requests or intents, the human user 105 may be transferred to human attendant 174.

Figure 2:
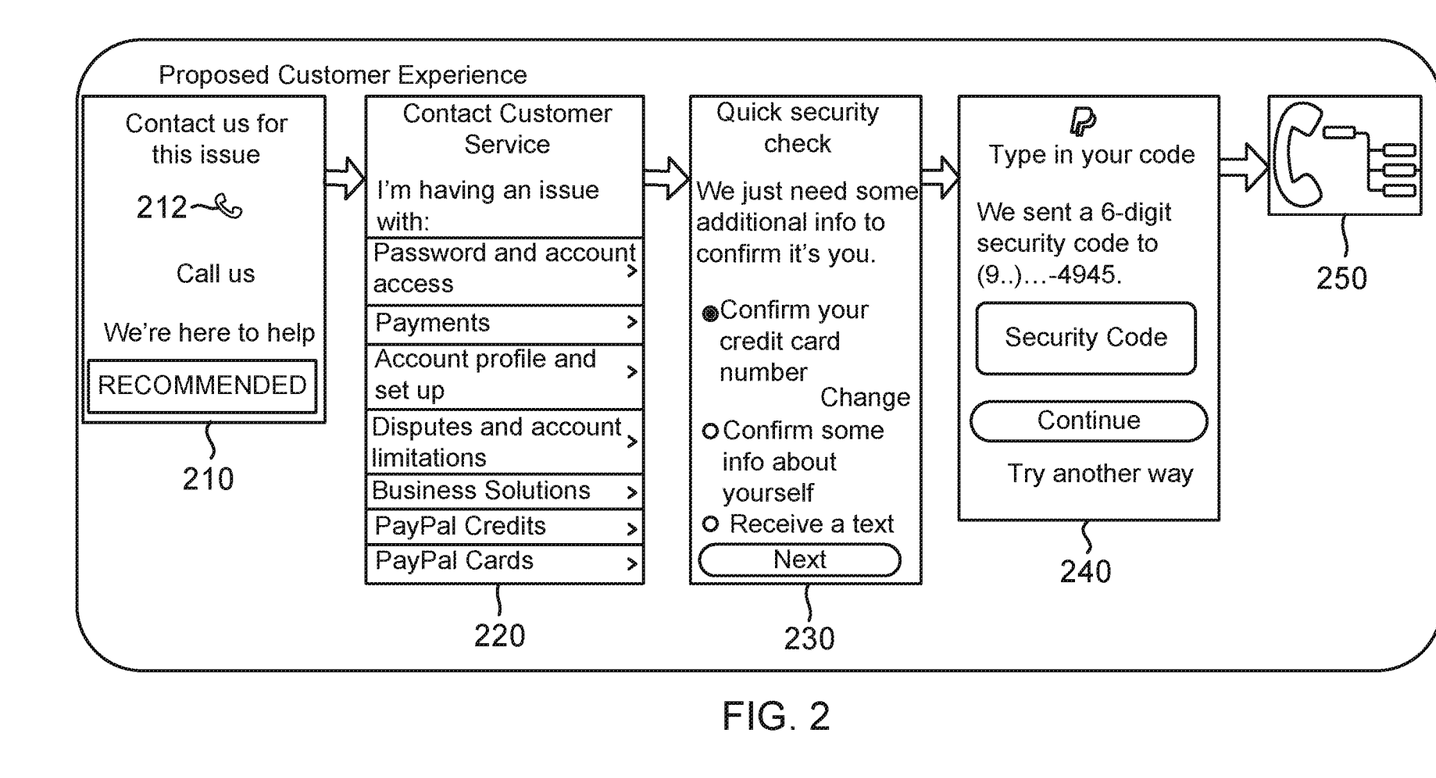
FIG. 2 is an illustration of an example process for authenticating a user, according to one embodiment.
Figure 3:
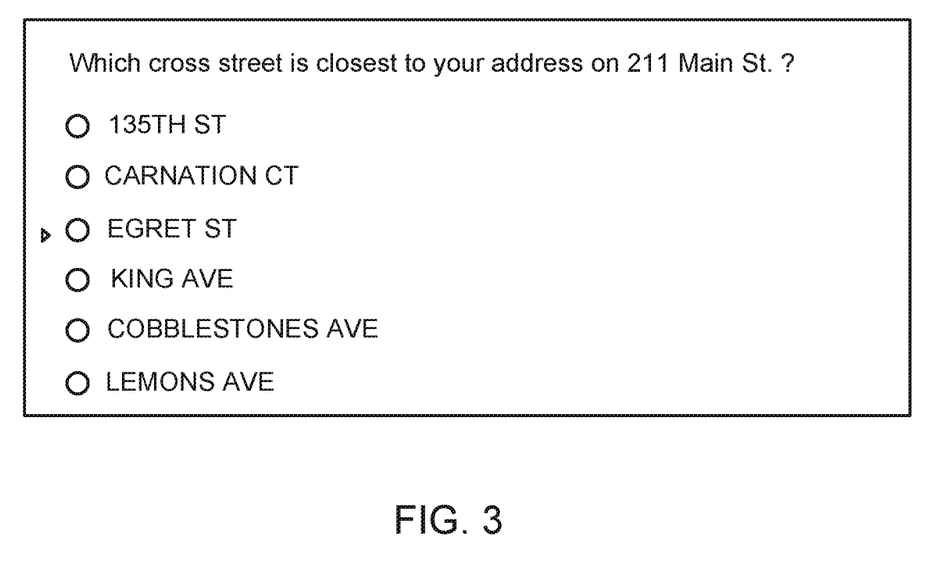
FIG. 3 is an illustration of an example authentication action, according to one embodiment.
Figure 4:
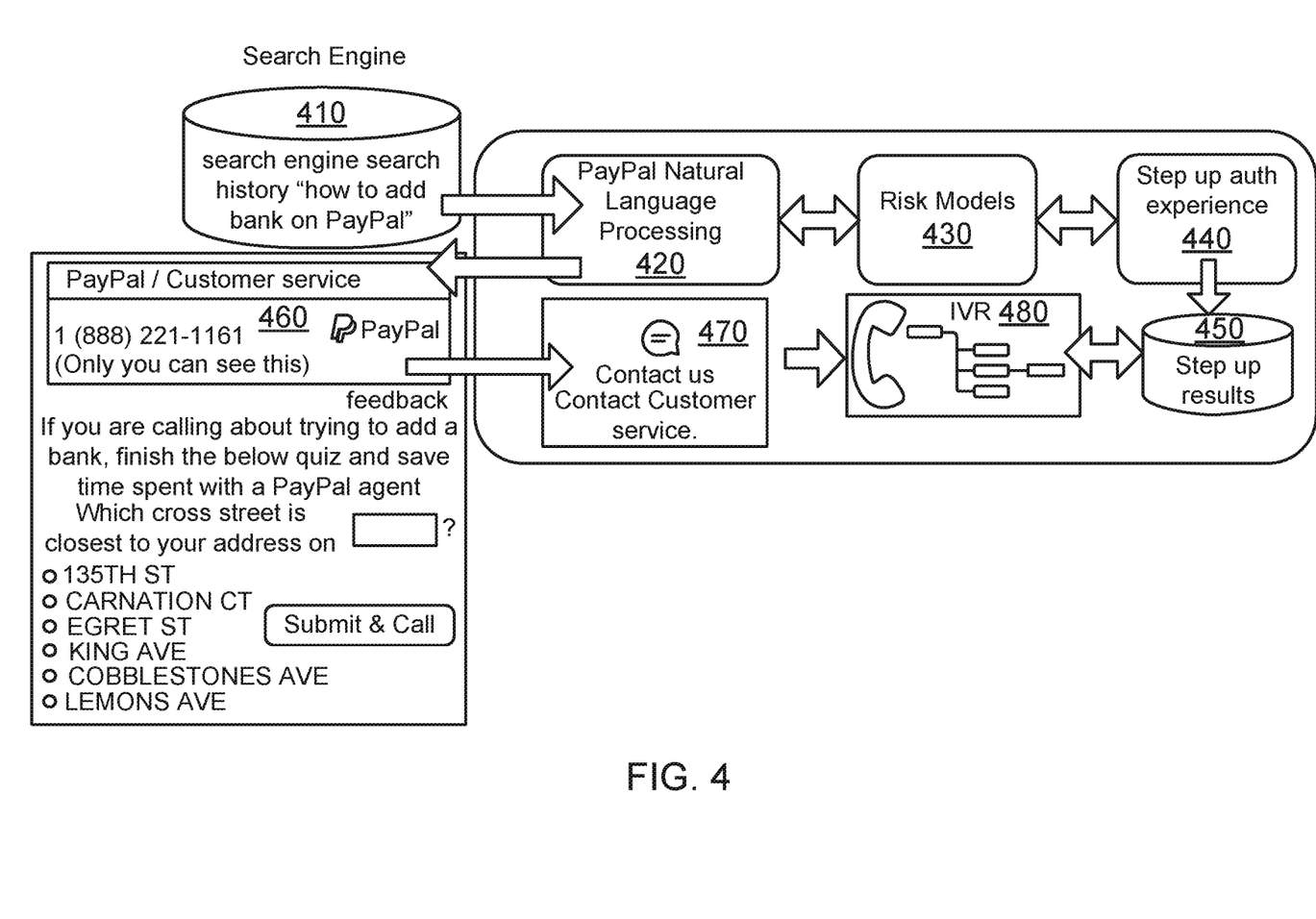
FIG. 4 is an illustration of an example process for authenticating a user, according to one embodiment.
Figure 5:
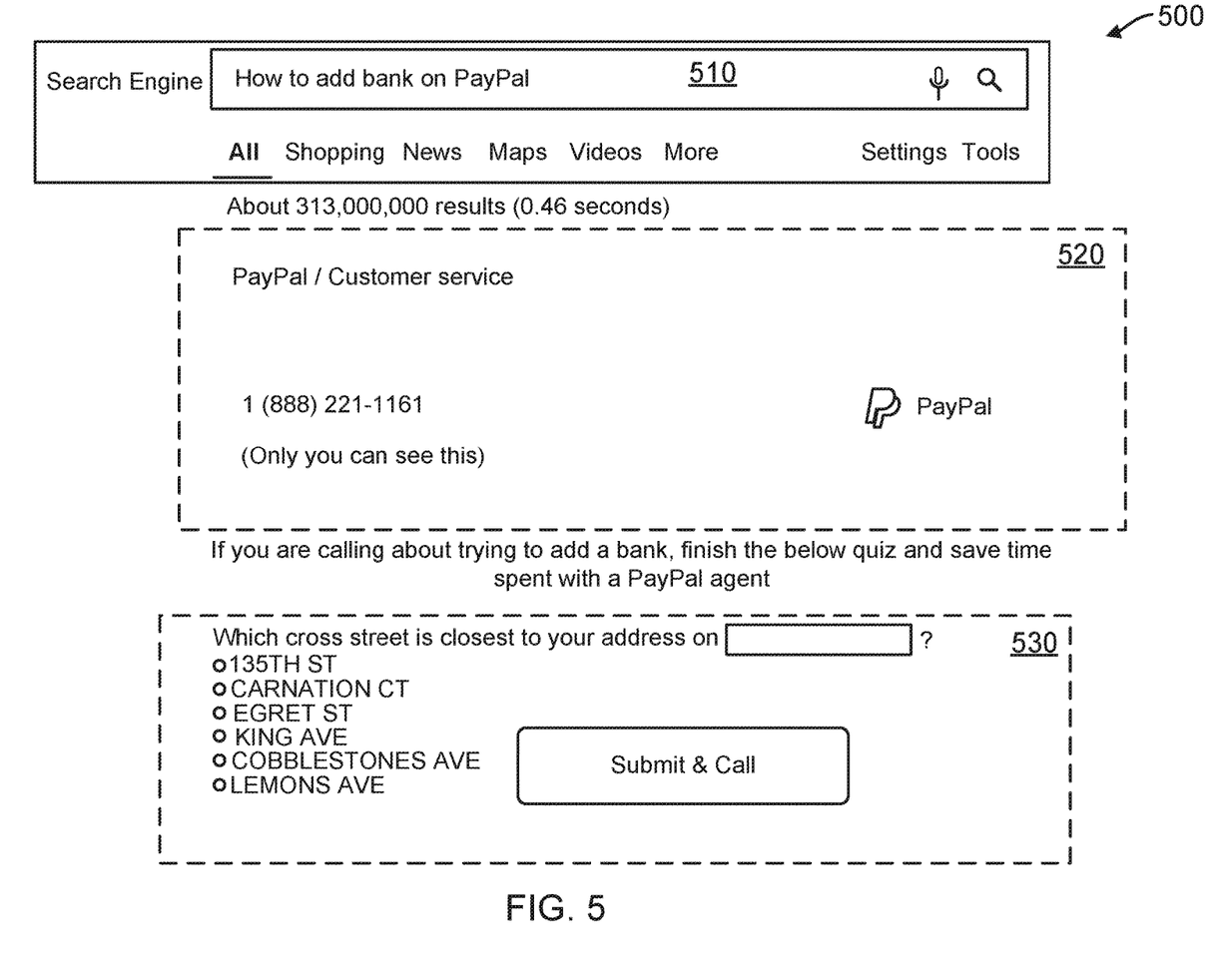
FIG. 5 is an illustration of a GUI for authenticating a user, according to one embodiment.

The various embodiments described below provide techniques to allow human user 105 to access her account information, including information the user and/or the account provider considers sensitive, such as account balance, account numbers, user date of birth, answers to security questions, transaction history, portions of the user social security number, password, PIN, username, security codes, and other information that may be used by others to access the user account or impersonate the user. FIGS. 2-3 describe an example wherein the human user goes through help center application 142 to access the account information. FIGS. 4-5 describe an example where in the human user 105 goes through interface application 152 to access that account information. Similarly, FIGS. 6-7 describe an example where in the human user 105 goes through the helper bot application 182 to access that account information.

FIG. 2 is an illustration of an authentication process that may be performed by help center application 142 (FIG. 1) to authenticate the human user 105, according to one embodiment. In this example, human user 105 is using user device 110 to access her service provider account by a web browser or application. Human user 105 is thus communicating with help center application 142 over network 160. The example of FIG. 2 also assumes that human user 105 is logged into her service provider account by, e.g., a login and password.

FIG. 2 shows a series of actions 210-250, where each of the actions is illustrated by an image that may be shown upon a GUI presented by help center application 142 upon a screen of user device 110. In this case, each of the images associated with the actions 210-240 represents interactive web objects, where the user may make a selection by clicking a mouse, touching a touchscreen, or providing other appropriate input to choose a displayed option.

In the example use case of FIG. 2, the user is already logged into her service provider account at action 210. The user 105 desires to access account information, such as to dispute a charge, apply for a credit card, reset a password, make a payment, add one or more bank accounts or other credit cards, check a balance, or the like. In this case, either the human user prefers to access the information over a phone call, or the action is only available by phone call. In any event, at action 210, the user is prompted to begin a voice-based communication session, and the user may accept beginning the process for a voice-based communication session by clicking or otherwise selecting the phone-shaped icon 212.

At action 220, and in response to the user accepting the prompt to call in, the help center application 142 presents a list of options to determine the intent of the user. For instance, the GUI at action 220 shows a number of actions including "password and account access," "payments," and the like. The user may interact with the GUI to select one or more of those options, thereby informing the help center application 142 of her intent.

Various embodiments include different levels of security protocols associated with different intents. For instance, an intent that accesses a certain type of information, but perhaps not the kind of information that would be expected to cause serious damage in the wrong hands, may implicate a policy that requires a particular form of step-up authentication such as entering a short message service (SMS) code. In another example, an intent that accesses more sensitive or personal information may implicate a policy that requires another form of step up authentication such as knowledge-based authentication (KBA). The example of FIG. 2 implicates a policy that requires entering an SMS code.

At action 230, the GUI of help center application 142 begins the security protocol by asking the human user 105 to select from three items, and in this instance the user has selected "confirm your credit card number." The user may then select "next."

Action 240 includes the user entering a code received by SMS. Specifically, the user's account may be associated with a known cellular telephone number. The help center application 142 may access the database 146 to acquire the cellular telephone number and then send a pseudorandom six-digit security code to that known cellular telephone number. Upon receipt, the human user 105 may then type the six-digit security code into the GUI and select "continue." Assuming that the human user 105 has entered the correct credit card number and also entered the correct six-digit security code, the human user 105 has been authenticated at that point.

Although not shown explicitly in FIG. 2, the help center application 142 may then save information to intermediate storage 144. The information may include, for example, the user's account number, the user's intent, method of challenge that was presented, and outcome of the challenge. Help center application 142 may then prompt the user to call in to IVR application 172 either by entering a particular phone number, or if the user is in a capable browser, beginning the voice-based communication session by WebRTC or other protocol.

At action 250, the user has moved on from the GUI of help center application 142. When the user calls into the IVR application 172, the IVR application 172 accesses intermediate storage 144 and matches the user to the particular account to determine whether the user is authenticated for the particular intent. Assuming the human user 105 is properly authenticated, action 250 includes servicing the user's intent using either or both of IVR application 172 or human attendant 174. Of course, human users sometimes change their intents. In a scenario in which the human user 105 at action 250 indicates a different intent to either IVR application 172 or the human attendant 174, the human user 105 may then be redirected to action 222 to select the appropriate intent and redo authentication, perhaps by another authentication method. Thus, the technique illustrated by FIG. 2 may be flexible to accommodate the user having multiple intents or changing an intent during the process.

FIG. 3 illustrates an example graphical web element that may be presented on a GUI of help center application 142 providing a different form of authentication, according to one embodiment. The specific example of FIG. 2 shows the user being authenticated by entering a credit card number and entering a six-digit security code received by SMS. By contrast, FIG. 3 illustrates an example action that may be used in addition to or in place of actions 230-240 to authenticate the user in a scenario in which the user indicates an intent that may implicate or is associated with more secure information.

Continuing with this example, FIG. 3 shows a particular instance of KBA that asks the user to select information that the user would be expected to know but an attacker who does not know the user would not be expected to know. For example, the user may be asked to answer a geographic question regarding streets near her home. Note that in this example, user account information stored in database 146 may include a variety of different user identifying information (e.g., a user's home address) that can be utilized during authentication. The scope of embodiments is not limited to any particular type of user identifying information including a home address, as other user identifying information may be stored and utilized, such as a user's phone number, personal questions such as high school attendance and car color, and the like. Assuming that the human user 105 answers the question correctly, then the action shown in FIG. 3 progresses to either an additional security protocol or to the IVR application, as in action 250 of FIG. 2. If the human user 105 answers the question incorrectly, then the help center application 142 may present other security challenges by its GUI, take other action, or end the transaction.

Various embodiments may provide an advantage by reducing an amount of effort that is required by human attendants at the call center 170. However, various embodiments may also utilize those human attendants in instances in which it is difficult to authenticate the user otherwise. In other words, if the human user 105 fails the authentication attempts at actions 230, 240 or FIG. 3, the user may be passed to a human attendant or other alternative. Furthermore, such example may include assisting the user by chat or other textual technique instead of or in addition to a voice-based communication session.

FIGS. 4 and 5 illustrate an example technique to authenticate a user by using search engine interface application 152, according to one embodiment. In this example, as in the examples described above, the human user 105 is authenticated by a GUI, in this case the GUI of search engine interface application 152, before being directed to a voice-based communication session.

At action 410 of FIG. 4, the user searches for the term "how to add bank on PayPal". This is further illustrated in FIG. 5, wherein the human user 105 types in that particular phrase at search field 510.

The search engine itself may then use natural language processing (NLP) to ascertain the user's intent at action 410, or the search engine may then recognize that the request is for a service provider and send the text string to the service provider (e.g., at web server 140 of FIG. 1) for the service provider server to perform NLP at action 420. In any event, NLP is used to ascertain that the user's intent is to link another bank account to a service provider account.

In this particular example, the user is signed into an account associated with the search engine, where the search engine and the service provider have a relationship and share some account information. In this case, some search engine accounts are linked to some service provider accounts either at database 146 (at web server 140) or at database 154 of search engine server 150 or at both.

The search engine server 150 also provides search engine account credentials and/or the service provider server account credentials to the web server 140, so that the web server 140 has account credentials that it can link to a particular service provider account along with a user intent. The help center application 142 at the web server 140 then runs risk models at action 430 to determine particular security policies associated with that intent. The help center application 142, in response to the policy at action 430, identifies particular step up authentication challenges to provide to the user 105 and passes that step up authentication challenge to the search engine server 150 for the search engine server to render in its GUI of interface application 152. This is shown at action 460 and at FIG. 5.

FIG. 5 shows interactive web objects that may be presented on the GUI of search engine interface application 152 in this embodiment. Item 520 is a search result that is presented to the user as an alternative to authentication using interactive item 530. Interactive item 530 includes the authentication challenge that was passed from help center application 142 to the interface application 152 at action 460. In this example, the user may select an appropriate answer from the list of appropriate answers and then select "submit and call" to authenticate using the challenge.

Assuming that the user is properly authenticated at action 460, the search engine server 150 passes that result to the web server 142 to be stored in intermediate storage 144 at action 450. In some of the examples, the "submit and call" link automatically connects the user to the call center 170 in a voice-based communication. In other examples, the user may then be prompted to call the call center using the customer service number shown in web result 520, or is prompted at action 470. In any event, the user begins a voice-based communication session with IVR application 172 at action 480. Once again, the IVR application 172 accesses the result of the authentication from the intermediate storage 144 and, assuming that the account matches and the user is authenticated, continues to process the user's intent. Furthermore, such example may include assisting the user by chat or other textual technique instead of or in addition to the voice-based communication session.

Figure 6:
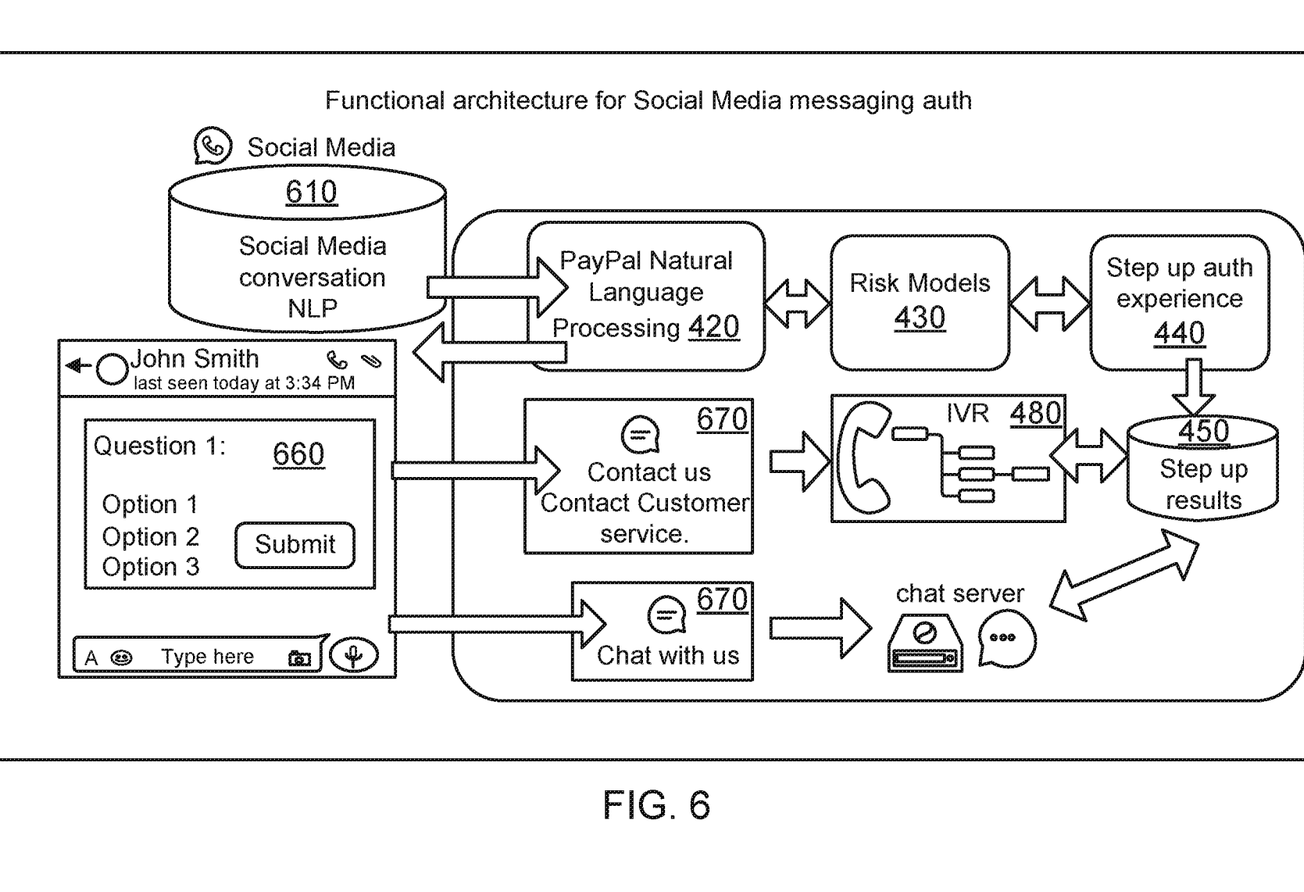
FIG. 6 is an illustration of an example process for authenticating a user, according to one embodiment.
Figure 7:
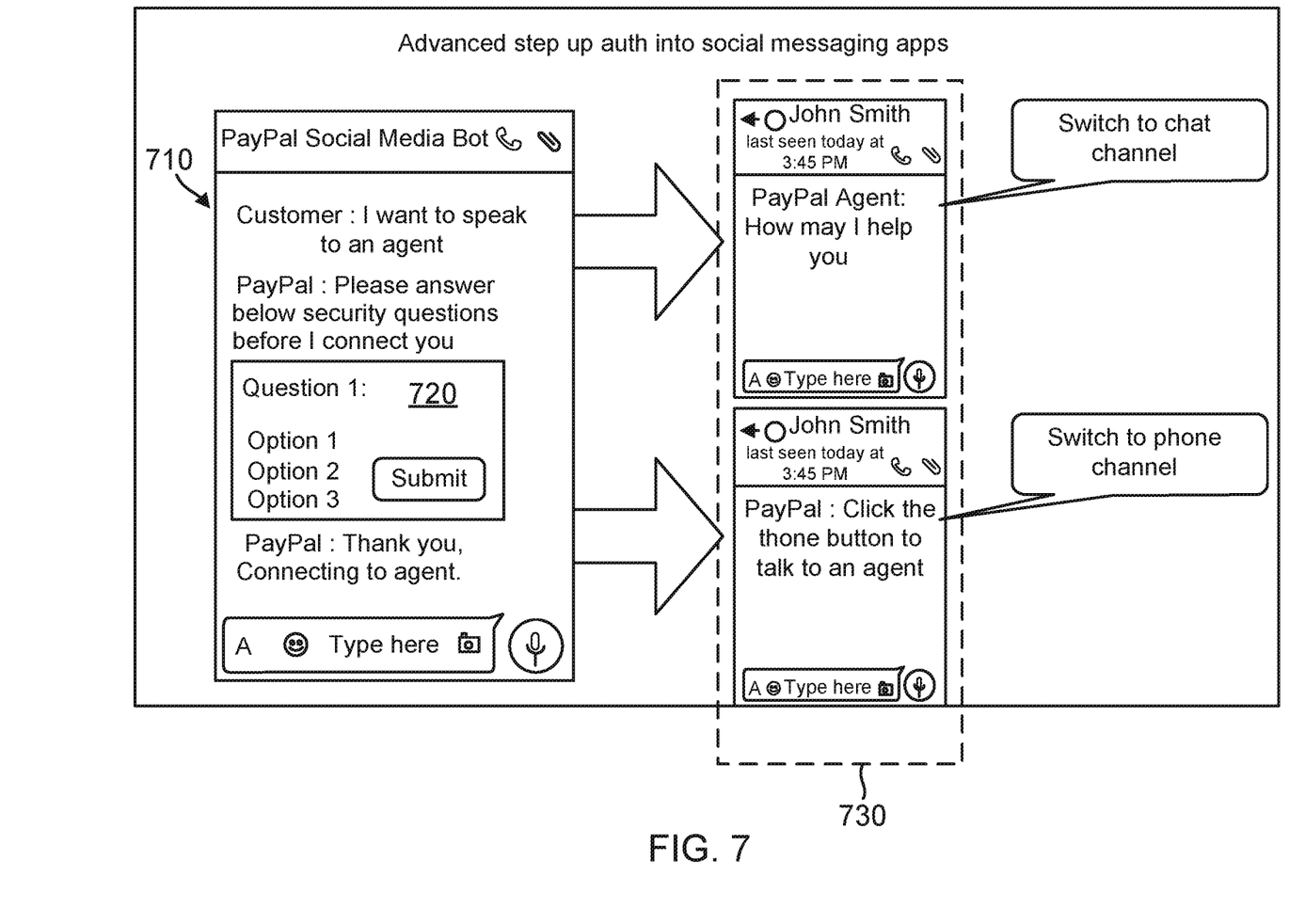
FIG. 7 is an illustration of a GUI for authenticating a user, according to one embodiment.

FIGS. 6 and 7 illustrate an example technique to authenticate a user by using a social media helper bot application, according to one embodiment. The example of FIGS. 6 and 7 is similar to the search engine entry point example of FIGS. 4 and 5. However, in the example of FIGS. 6 and 7, a social media helper bot may determine whether to use step-up authentication based on NLP analysis performed on the user's input. The social media helper bot may then administer the authentication challenges, save the authentication result and other information to intermediate storage, and handoff the interaction to a phone or chat agent. The phone or chat agent may then access the information from intermediate storage to consume the output of the authentication, as in the examples above.

In this example, as in the examples described above, the human user 105 is authenticated by a GUI, in this case the GUI of helper bot application 182, before being directed to a voice-based communication session.

The example of FIGS. 6 and 7 is similar to the example of FIGS. 4 and 5, and in fact same or similar actions 420, 430, 440, 450 are present in both examples. At action 610, human user 105 is logged into the social media platform associated with social media server 180 and sends a message to social media helper bot application 182. For instance, the user may send a message such as, "how to add bank on PayPal." The social media server 180 itself may then use NLP to ascertain the user's intent at action 610, or the social media server 180 may recognize that the request is for a service provider and in response transmit the text string to the web server 140 for web server 140 to perform NLP to ascertain the user intent.

The user is signed into an account associated with the social media server 180, and the social media server 180 and the service provider may have a relationship to share account information credentials. In this use case, some social media accounts are linked to some service provider accounts either at database 146 or at database 184 or at both. The social media server 180 provides the social media account credentials and/or the service provider server account credentials to the web server 140 so that the web server 140 can then identify a particular service provider account along with a user intent. The help center application 142 then runs risk models, identifies particular authentication policies, identifies particular authentication challenges, and transmits a particular authentication challenge to the social media server 180 at actions 430-440.

Social media server 180 may then render the step up authentication challenge in its GUI at action 660. The human user 105 may provide an answer to the challenge and click "submit." The social media helper bot application 182 transmits the result to the help center application 142, which stores the authentication result in intermediate storage 144 at action 450. The social media helper bot application 182 may then prompt the user to begin a voice-based communication session with IVR application 172 at action 670. After the user contacts the IVR application 172, the IVR application 172 identifies the user account, searches the intermediate storage for authentication results corresponding to that user account, and (assuming the user has passed and the intent is still the same) services the user intent at action 480.

In this example, action 670 may also include presenting a chat server option to the user instead of or in addition to the voice-based communication session.

Looking to FIG. 7, the use case is slightly different from that shown in FIG. 6. In example of FIG. 7, the user 105 simply asks to speak to an agent via GUI 710. In response to the request to speak to the agent, the social media helper bot 182 proceeds with actions 420-440 to present an appropriate step up authentication challenge 720 at GUI 710. Assuming that the user attempts the challenge, then the results are saved to intermediate storage action 450, and the user is then prompted at action 730 to either chat or begin a voice-based communication session.

Figure 8:
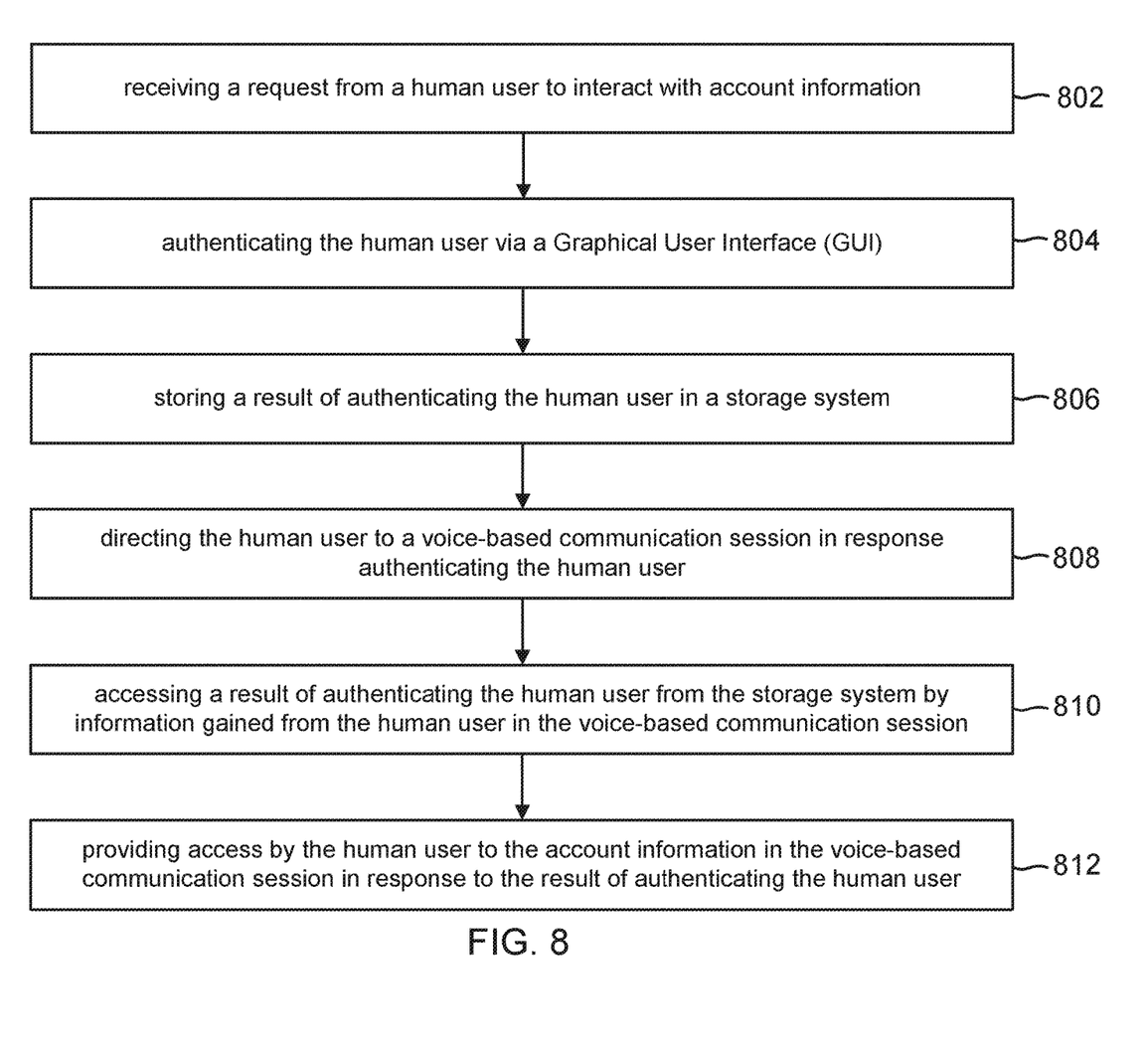
FIG. 8 is an illustration of a method for authenticating a user, according to one embodiment.

FIG. 8 is an illustration of example method 800 for authenticating a user, according to one embodiment. Method 800 may be performed by a service provider hosting a multitude of user accounts (e.g., such as payment accounts) and, specifically, by processors of the web server 140 and one or more of search engine server 150, social media server 180, and a server at call center 170 as they execute computer code to provide functionality described herein.

At action 802, the help center application 142 receives a request from a human user to interact with account information. In one example, the user may simply want to view information, but in other examples the user may want to edit information by adding or deleting certain items from the account. In the examples above, the user desires to link an additional bank account to a service provider account, though the scope of embodiments is not limited to any particular request. Examples are shown at actions 210-220 of FIG. 2, action 410 of FIG. 4, and action 610 of FIG. 6.

At action 804, the help center application 142 authenticates the human user via a GUI. In one example, the user is logged into the particular account that the user wishes to access, and the service provider may provide the GUI by its own web server. For instance, the service provider may render an authentication challenge on a GUI so that the user may use a computer interface rather than an audio interface to complete the challenge. Authentication may include receiving user input via the GUI to a question and answer challenge and then determining that the user input matches a correct answer to the challenge. Examples are shown above at actions 230-240 of FIG. 2, FIG. 3, action 460 of FIG. 4 and web item 530 of FIG. 5, action 660 of FIG. 6 and action 720 of FIG. 7.

At action 806, the help center application 142 stores a result of authenticating the human user in a storage system. An example is shown at FIG. 1, where help center application 142 would store the authentication result in intermediate storage 144. Intermediate storage 144 may include one or more storage devices in communication with a server of the service provider and configured to store results of the authentication in any particular form. For instance, intermediate storage may store authentication results in files, database entries, or the like.

At action 808, the help center application 142 may direct the human user to a voice-based communication session in response to authenticating the human user. For instance, the help center application 142 may provide the user with a web link to click which would start a voice-based communication session according to an appropriate protocol such as WebRTC. In another example, help center application 142 may simply provide a number that the user may call. Examples are shown at action 250 of FIG. 2, action 470 of FIG. 4, web item 530 of FIG. 5, and action 670 of FIG. 6.

At action 810, IVR application 172 accesses a result of authenticating the human user from the storage system. For instance, the user may call into the IVR application 172 and be prompted to provide a login, and account number, digits of a Social Security or credit card number, or the like. The IVR application 172 may then use that information to match the user to an account and then use that account information to look up authentication results in intermediate storage 144. Therefore, the IVR application 172 accesses the result of authentication, even though the authentication was performed by another entity, e.g., help center application 142.

At action 812, the IVR application 172 or the human attendant 174 provides access by the human user to the account information in the voice-based communication session. Specifically, as in the examples above, the user may be authenticated for a specific intent, and having been authenticated according to a security level associated with that intent, the call center may service the user's intent. An example of servicing the user's intent may include allowing the user to access certain information, link an additional bank account to the user's service provider account, and the like.

The scope of embodiments is not limited to the particular series of actions depicted in FIG. 8. Rather, various embodiments may add, omit, rearrange, or modify the actions. For instance, in some instances the user may change her intent after entering the voice-based communication session. In such instance, if the changed intent requires greater security, the user may be redirected to the GUI to perform additional authentication before returning to another voice-based communication session. Also, and as noted above, the system may assist the user by chat or other textual technique instead of or in addition to a voice-based communication session.

Figure 9:
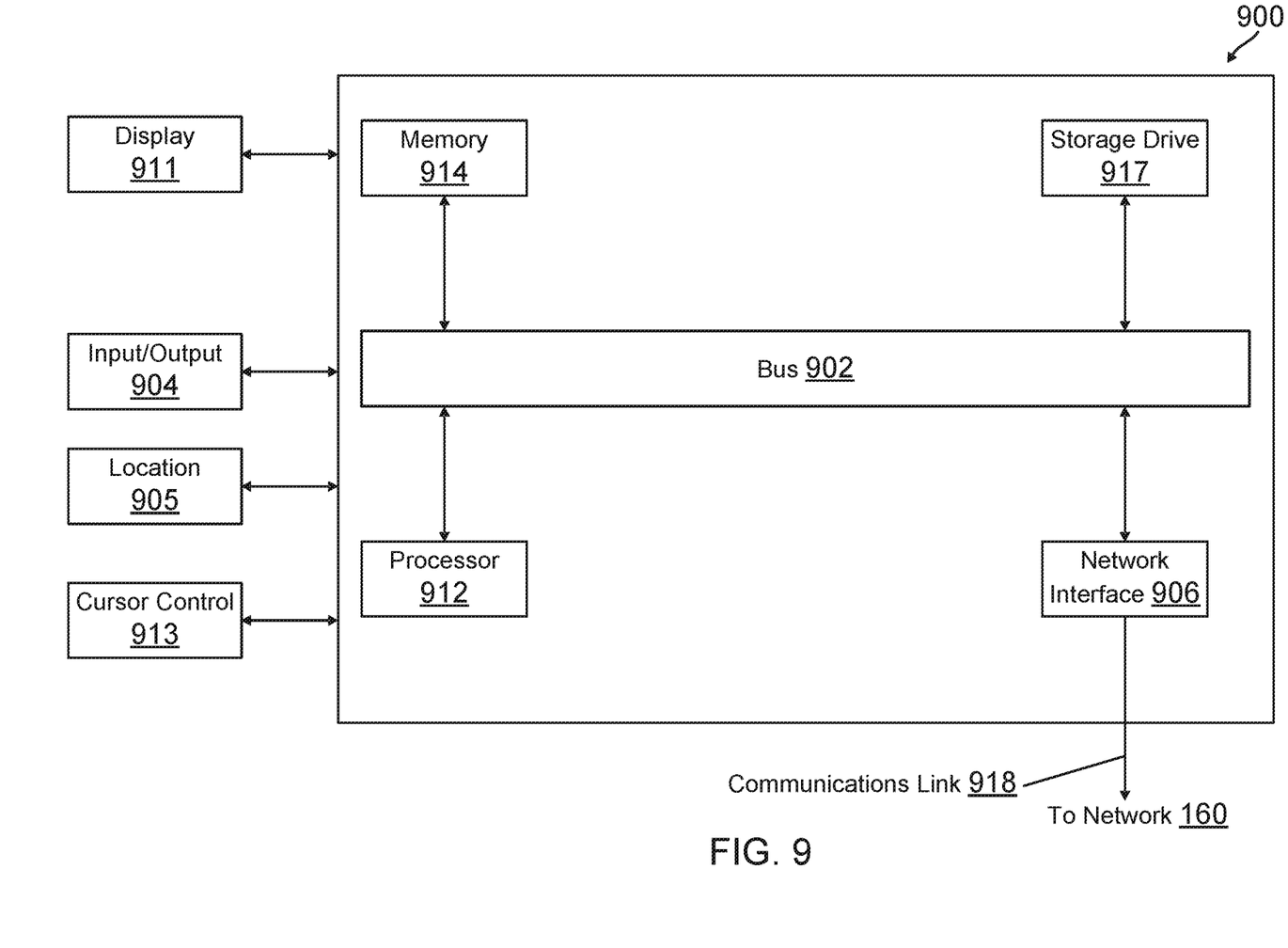
FIG. 9 is a block diagram of a computer system suitable for implementing one or more components in FIG. 1 according to one embodiment.

FIG. 9, an embodiment of a computer system 900 suitable for implementing, for example, the computing devices 110, 140, 150, 180, and any servers of call center 170 of FIG. 1 discussed above. It should be appreciated that other devices utilized in the system discussed above may be implemented as the computer system 900 in a manner as follows.

In accordance with various embodiments of the present disclosure, computer system 900, such as a smart phone, computer, and/or a network server, includes a bus 902 or other communication mechanism for communicating information, which interconnects subsystems and components, such as a processing component 912 (e.g., processor, microcontroller, digital signal processor (DSP), etc.), a system memory component 914 (e.g., RAM) a storage drive component 917 (e.g., solid-state, hard drive, or optical), a network interface component 906 (e.g., wireless card, modem, or Ethernet card), a display component 911 (e.g., a touchscreen, CRT, or LCD), an input/output component 904 (e.g., keyboard, keypad, a touchscreen), a cursor control component 913 (e.g., mouse, pointer, or trackball), and/or a location determination component 905 (e.g., a Global Positioning System (GPS) device as illustrated, a cell tower triangulation device, and/or a variety of other location determination devices known in the art). In one implementation, the storage drive component 917 may comprise a database having one or more storage drive components.

In accordance with embodiments of the present disclosure, the computer system 900 performs specific operations by the processor 912 executing one or more sequences of instructions contained in the memory component 914, such as described herein with respect to FIGS. 1-8 discussed above. Such instructions may be read into the system memory component 914 from another computer readable medium, such as storage drive 917. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 912 for execution. Such a medium may take many forms, including but not limited to, non-volatile media and volatile media. In various implementations, non-volatile media includes hard drive or solid state drives, such as the storage drive component 917, and volatile media includes dynamic memory, such as the system memory component 914. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of the computer systems 900 coupled by a communication link 918 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 918 and the network interface component 906. The network interface component 906 may include an antenna, either separate or integrated, to enable transmission and reception via the communication link 918. Received program code may be executed by processor 912 as received and/or stored in storage drive component 917 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, from a first user device, a request to access a user account;
   providing, on the first user device, an electronic user interface for authenticating a user of the first user device for accessing the user account;
   presenting, via the electronic user interface on the first user device, a list of selectable answers in a question and answer challenge;
   authenticating the user of the first user device for accessing the user account based on a selection of at least one selectable answer from the list of selectable answers received via the electronic user interface on the first device;
   in response to authenticating the user, causing a second user device to initiate a call;
   receiving the call from the user via the second user device;
   receiving, through a voice interaction with the user via the second user device, an indication for processing a first transaction through the user account, wherein the user is not authenticated to access the user account via the second user device; and
   providing the user access to the user account via the second user device based on the authenticating of the user via the first user device and the request for accessing the user account being for the first transaction.

2. The system of claim 1, wherein the operations further comprise:
   querying a storage system using an identification of the user account for a result of the authenticating the user via the first user device.

3. The system of claim 1, wherein the authenticating the user via the first user device comprises:
   receiving a user input indicating the selection of the at least one selectable answer via the electronic user interface of the first user device; and
   determining that the at least one selectable answer matches a predetermined answer to the question and answer challenge.

4. The system of claim 1, wherein the operations further comprise:
   determining an intent of the user through interactions with the user via the electronic user interface, wherein the providing the user access to the user account via the second user device is further based on the intent of the user being related to performing the first transaction.

5. The system of claim 1, wherein the operations further comprise:

determining that the call is associated with the user account based on a device identifier of the second user device.

6. The system of claim 1, wherein the request comprises a search engine query directed at the user account, and wherein the first user device is logged into an account associated with a search engine.

7. A method comprising:
in response to receiving, from a first user device, a request to access a user account, providing, by an electronic interface server, a graphical user interface (GUI) on the first user device;
presenting, by the electronic interface server via the GUI on the first user device, a list of selectable answers in a question and answer challenge;
authenticating, by the electronic interface server, a user of the first user device for accessing the user account based on a selection of at least one selectable answer from the list of selectable answers received via the GUI on the first user device;
storing, by the electronic interface server, a result of the authenticating the user in a data storage;
in response to authenticating the user, causing, by the electronic interface server, a second user device to initiate a phone call to a voice based communication system;
receiving, by the voice-based communication system, the phone call from the user via the second user device;
accessing, by the voice-based communication system, the result of the authenticating the user from the data storage; and
providing, by the voice-based communication system, the user access to the user account via the second user device based on the result of the authenticating the user.

8. The method of claim 7, further comprising:
determining an account identifier based on an identifier associated with the second user device; and
retrieving, from the data storage, the result of the authenticating the user using the identifier associated with the second user device.

9. The method of claim 7, wherein the authenticating the user comprises:
receiving a user input indicating the selection of the at least one selectable answer via the GUI; and
determining that the at least one selectable answer matches a predetermined answer to the question and answer challenge.

10. The method of claim 7, further comprising:
receiving, by the voice-based communication system from the second user device, a transaction request associated with the user account; and
processing a transaction corresponding to the transaction request for the user account.

11. The method of claim 10, further comprising:
determining an intent of the user based on the interactions with the user via the GUI, wherein the transaction is processed based on the intent of the user being related to the transaction request.

12. The method of claim 7, wherein the request from the user comprises a search engine query directed at the user account.

13. The method of claim 12, further comprising:
processing the search engine query using a natural language processor; and
determining an intent of the user based on the processing of the search engine query.

14. A non-transitory machine-readable medium having stored thereon machine-readable instructions executable to cause a machine to perform operations comprising:
in response to receiving a request to access a user account, presenting, via a graphical user interface (GUI) of a first user device, a knowledge-based authentication (KBA) challenge, wherein the KBA challenge comprises a plurality of selectable options;
authenticating a user of the first user device based on a selection of one of the plurality of selectable options received via the GUI;
storing a result of the authenticating the user in a data storage system;
in response to authenticating the user via the first user device, causing a second user device to establish an online chat session with a text-based communication system;
receiving, via the online chat session from the second user device, an indication for processing a first transaction through the user account, wherein the user is not authenticated to access the user account via the second user device;
accessing the result of the authenticating the user from the data storage system; and
providing the user access to the user account via the online chat session based on the result of the authenticating the user and the request for accessing the user account being for the first transaction.

15. The non-transitory machine-readable medium of claim 14, wherein the operations further comprise:
determining an account identification based on an identifier associated with the second user device; and
querying the data storage system using the account identification for the result of the authenticating the user.

16. The non-transitory machine-readable medium of claim 14, wherein the operations further comprise:
determining that the online chat session is associated with the user account based on a device identifier of the second user device.

17. The non-transitory machine-readable medium of claim 14, wherein the operations further comprise:
processing the first transaction through the user account based on the result of the authenticating the user.

18. The non-transitory machine-readable medium of claim 17, wherein the operations further comprise:
determining an intent of the user through interactions with the user via the GUI, wherein the first transaction is processed further based on the intent being related to performing the first transaction.

19. The system of claim 1, wherein the operations further comprise:
storing a result of the authenticating the user in a data storage; and
subsequent to receiving the call from the user via the second user device, retrieving the result of the authenticating the user from the data storage, wherein the providing the user access to the user account via the second user device is based on the retrieved result.

20. The system of claim 1, wherein the result of the authenticating the user is retrieved from the data storage based on a device identifier of the second user device.

* * * * *